Patented July 4, 1933

1,917,207

UNITED STATES PATENT OFFICE

LUDWIG KAUFMANN, OF BERLIN-WILMERSDORF, GERMANY

TRIARYL STIBINE SOLUTIONS

No Drawing. Application filed November 24, 1931, Serial No. 577,162, and in Germany December 3, 1930.

My invention relates to triaryl stibine solutions and their application.

It is an object of my invention to eliminate certain difficulties presented by the old solutions, normally in petroleum ether and chloroform.

To this end I prepare a triaryl stibine solution in fat oil.

I have found that fat oils are excellent solvents for triaryl stibines and that the solutions of this type are particularly suitable for performing reactions with triaryl stibines.

For instance, it is very difficult to make a good alcoholic solution from finished triaryl stibine iodides not only because such iodides are hard to dissolve in alcohol but also because their high sensitivity may cause separation of iodine during the dissolving operation.

I have found that if the triaryl stibine iodides are formed in the presence of fat oils and the concentration is properly selected, the separation of the otherwise difficultly soluble iodides is very much retarded. The fatty oils to some extent play the part of protecting colloids for the iodides.

In reducing my invention to practice, I may for instance, dissolve triaryl stibine in a mixture of a fat oil, such as rhicinus oil, and alcohol or hydrocarbon, and add to the solution thus obtained a corresponding amount of alcoholic iodine solution. When this solution is mixed with the first solution a colourless solution of the formed iodides is obtained immediately which remains clear for a long time and from which the iodide is precipitated later and quite gradually.

The general formula of triaryl stibine is $(C_nH_{n-1})_3Sb$, and it reacts with iodine as follows:

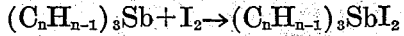

In this manner I obtain an iodine solution which for a certain period is absolutely suitable and with which all reactions may be performed which require action or transfer of iodine. The solution is also suitable for therapeutic purposes as while on the one hand it contains iodine in a very active condition, on the other hand it has the good properties of being colourless and of not irritating the skin.

Iodine separation from a solution of the kind described will occur if the solution is left standing, as mentioned but may be accelerated by active rays, for instance, sunlight, and also by catalytic substances. This is confirmed by applying a solution to starch paper and exposing it to the air. The paper will soon show a brown discoloration which when the paper is wetted changes to the well known iodine starch colour. Active oxygen acts in a similar manner which may be demonstrated by applying hydrogen peroxide in very thin solution to the starch paper.

I claim:

1. As a new composition, a solution of triaryl stibine in fat oil.

2. As a new composition, a solution of triaryl stibine in fat oil and a solvent mixable with said oil.

3. As a new composition, a solution of triaryl stibine in fat oil and hydrocarbon.

4. As a new composition, a solution of triaryl stibine in fat oil and alcohol.

5. The method of making solutions of triaryl stibine, comprising the reaction of a solution of triaryl stibine in fat oil with a solution of iodine.

6. The method of making solutions of triaryl stibine, comprising the reaction of a solution of triaryl stibine in fat oil and in a solvent mixable with the fat oil, with a solution of iodine.

I affix my signature.

LUDWIG KAUFMANN.